United States Patent [19]
Harenberg

[11] Patent Number: 5,758,901
[45] Date of Patent: Jun. 2, 1998

[54] HEIGHT ADJUSTING MECHANISM FOR A SAFETY BELT DEVICE

[75] Inventor: Holger Harenberg, Rellingen, Germany

[73] Assignee: Autoliv Development AB, Vargarda, Sweden

[21] Appl. No.: 584,002

[22] Filed: Jan. 5, 1996

[30] Foreign Application Priority Data

Jan. 7, 1995 [DE] Germany ............ 195 00 268.7

[51] Int. Cl.$^6$ .................................................. B60R 22/20
[52] U.S. Cl. .............................. 280/801.2; 297/483
[58] Field of Search ................... 280/801.2, 808, 280/805, 801.1; 297/483, 468

[56] References Cited

U.S. PATENT DOCUMENTS

| | | | |
|---|---|---|---|
| 4,556,255 | 12/1985 | Kawai | 280/801.2 |
| 4,973,084 | 11/1990 | Biller | 280/801.2 |
| 5,460,410 | 10/1995 | Petzi et al. | 280/801.2 |

FOREIGN PATENT DOCUMENTS

| | | | |
|---|---|---|---|
| 150065 | 7/1985 | European Pat. Off. | 280/801.2 |
| 0249910 | 12/1987 | European Pat. Off. | |
| 9101357 | 6/1991 | Germany | |

*Primary Examiner*—Peter C. English
*Attorney, Agent, or Firm*—Robert W. Becker & Associates

[57] ABSTRACT

A height adjusting mechanism for an upper brace of a shoulder belt of a safety belt device of a motorized vehicle has a locking device that includes a guide track having a longitudinal extension and having locking recesses distributed along the longitudinal extension. The locking device also includes a slide displaceable in the longitudinal direction and a locking lever with a locking projection. The locking lever has a supporting zone for supporting the locking lever on the slide such that the locking lever is pivotable from a locking position into a release position. In the locking position the locking projection engages one of the locking recesses. The locking lever has a zone of reduced material strength located between the locking projection and the supporting zone, wherein the zone of reduced material strength provides a deformative travel for the locking projection under load and has an abutment for limiting the deformative travel.

10 Claims, 2 Drawing Sheets

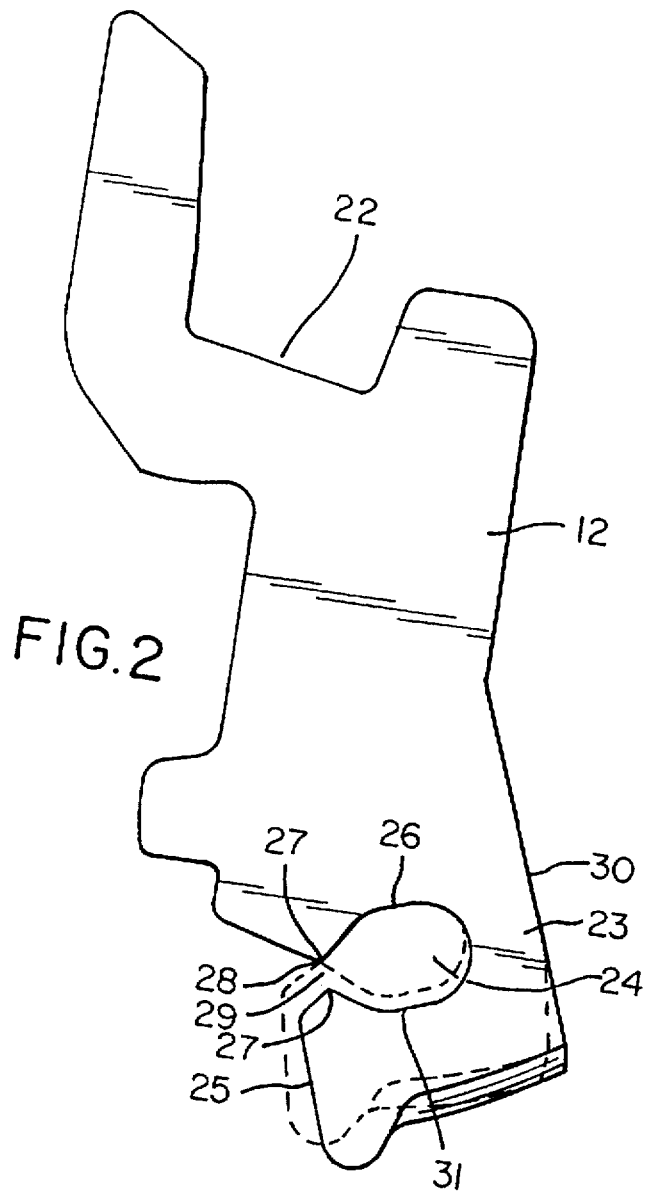

HEIGHT ADJUSTING MECHANISM FOR A SAFETY BELT DEVICE

BACKGROUND OF THE INVENTION

The present invention relates to a mechanism for height adjustment of the upper deflection or fastening brace for the shoulder belt of a safety belt device, especially in connection with motorized vehicles, which height adjusting mechanism is comprised of a locking device connected to a component of the vehicle and comprising a guide track with locking recesses arranged thereat. A coordinated locking lever of the locking device engages with its locking projection one of the locking recesses. The locking device is supported in a pivotable manner on a slide which is longitudinally movable within the guide track by means of a handling device so as to be pivotable between a locking and a release position.

A height adjusting mechanism with the aforementioned features is known from European Patent 0 249 910. It comprises a C-shaped guide track with recesses provided on both sides of the guide slot within the legs of the "C" and, in an alternative embodiment, a guide track having locking recesses provided at the bottom thereof.

For a height adjusting mechanism, the locking safety in a load situation, on the one hand, and especially the comfort of the user during adjustment of the brace-supporting slide, within the guide track, on the other hand, are important. During adjustment of the brace in the upward direction, the belt forces, the weight of the movable parts that must be displaced within the frame of the height adjusting mechanism as well as the friction resulting therefrom must be overcome. Furthermore, also the forces relating to the movement of the locking lever from its locking position into a position allowing the displacement of the slide must be overcome which forces are considerable because the locking lever, in general, is pre-stressed by a spring force into its locking position and the friction, resulting from the aforementioned belt forces and weights, must be overcome at the contacting location.

For ensuring of the locking safety, the locking projection, respectively, locking surface of the locking lever in the height adjusting mechanism known from European Patent 0 249 910 is arranged with an undercut whereby this undercut is defined as an angle between the connecting line between the supporting zone of the locking lever at the slide and the corresponding locking edge of the recess. This angle, i.e., undercut, is smaller than 90° in the direction of opening. (This definition of undercut will be used throughout the instant specification in connection with the invention.) With such an arrangement of the locking projection of the locking lever relative to the locking edge of the recess, it is ensured that the locking lever in a load situation is securely held within the recess of the guide track. However, at the same time, this embodiment has the disadvantage that the forces resulting from the movement of the locking lever from the locking position into the displaced position are correspondingly great because the slide must be slightly lifted counter to the actuating force by an amount corresponding to the undercut for releasing the locking projection.

It is therefore an object of the present invention to improve the aforementioned height adjusting mechanism such that with an unchanged locking safety in the load situation the operating comfort for displacing of the brace is improved.

SUMMARY OF THE INVENTION

A height adjusting mechanism for an upper brace of a shoulder belt of a safety belt device of a motorized vehicle according to the present invention is primarily characterized by:

a) a guide track having a longitudinal extension and having recesses distributed along the longitudinal extension, b) a slide displaceable in a direction of the longitudinal extension, and c) a locking lever comprising a locking projection, the locking lever having a supporting zone for pivotably supporting the locking lever on the slide such that the locking lever is pivotable from a locking position into a release position, wherein in the locking position the locking projection engages one of the recesses;

wherein the locking lever comprises a zone of reduced material strength located between the locking projecting and the supporting zone, wherein the zone of reduced material strength provides a deformative travel for the locking projection under load and comprises an abutment for limiting the deformative travel.

Preferably, the zone of reduced material strength is comprised of lateral notches positioned in a plane of the locking lever parallel to a bottom of the guide track and having therebetween a bending zone.

Advantageously, the locking lever has a lateral edge positioned remote from the guide track. The zone of reduced material strength is a cutout extending from the lateral edge toward the guide track. The cutout has a first edge located proximal to the supporting zone. The first edge is part of the abutment.

Preferably, the cutout has a second edge opposite the first edge. Each one of the first and second edges has a projection located in the area of the lateral edge of the locking lever. The abutment is comprised of the projections which provide a linear contact between the first and second edges.

In a preferred embodiment of the present invention, the cutout extends into the locking lever to such an extent that between an inner end of the cutout and a lateral edge of the locking lever facing the guide rail a bending zone is formed that has a resistance moment adapted to loading of the height adjusting mechanism during a load situation of the safety belt device.

Preferably, each one of the recesses has a locking edge for cooperating with the locking projection and the locking projection is arranged in one of the recesses such that during locking without loading only a small undercut is present relative to a connecting line between the supporting zone and the locking edge.

In yet another embodiment of the present invention each one of the recesses has a locking edge for cooperating with the locking projection and the locking projection is arranged in one of the recesses such that during locking without loading no undercut is present relative to a connecting line between the supporting zone and the locking edge.

Advantageously, each one of the recesses has a locking edge for cooperating with a locking projection and the locking projection is arranged in one of the recesses such that during locking without loading a positive angle is present relative to a connecting line between the supporting zone and the locking edge.

Preferably each one of the recesses has a locking edge for cooperating with the locking projection and the deformative travel has such a length that in the locking position under loading relative to a connecting line between the supporting zone and the locking edge a sufficient undercut is provided.

The basic idea of the present invention is that the locking lever is provided with a zone of reduced material strength positioned between the locking projection and its supporting zone at the slide. This zone of reduced material strength provides a deformative travel for the locking projection delimited by an abutment at the locking lever and during a loading situation the locking projection travels this deformative travel. The present invention has the advantage that the undercut required during a load situation results upon loading of the locking lever, while during actuation of the locking lever without loading, i.e., for adjusting the position with the height adjusting mechanism, this undercut is not yet present so that the movement of the locking lever from its locked position as well as back into the locking position, after completion of the adjustment movement, can be facilitated with a corresponding design of the locking projection at the locking lever so that the handling comfort is improved. Since for a locking lever which is not provided with a sufficient undercut at the locking projection in a load situation there is the risk of release because the loading of the height adjusting mechanism provides a force component in the direction of release of the locking lever, the inventive design of the locking lever with coordinated deformative travel for adjustment of the undercut, effective only during a loading situation, still provides the locking safety of the locking lever. After a plastic deformation of the locking lever its locking projection can be supported at the abutment present at the locking lever so that upon increased loading no breakage of the locking lever occurs.

According to a first embodiment of the invention, the zone of reduced material strength may be in the form of lateral notches provided at the locking lever in a plane which is parallel to the guide track and with bending zones arranged between the notches. In such an arrangement it is especially expedient when the locking lever is in the form of a more or less flat, stamped part.

According to another embodiment of the invention, it is suggested that the zone of reduced material strength is in the form of a cutout provided at the lateral edge of the locking lever that is facing away from the guide track. The edge of the cutout, which faces the supporting zone of the locking lever at the slide, forms the abutment. In this context it may be further provided that the oppositely arranged edges of the cutout in the area of the lateral edge of the locking lever are each provided with projections extending toward one another for forming a linear abutment area at the locking lever.

According to a further embodiment of the invention, it is provided that the cutout extends so far into the locking lever that between the cutout and the lateral edge of the locking lever facing the guide track a bending zone is provided having a resistance moment adjusted to the load situation. The resistance moment to be adjusted depends individually on the geometric design of the locking lever as well as on the material used for the locking lever.

According to a further embodiment of the invention, a small undercut or no undercut for the locking lever is provided. It is also possible to provide a positive angle of the locking edge at the locking lever relative to the connecting line; this facilitates moving the locking lever.

Finally, according to another embodiment of the invention, it is suggested that the deformative travel is of such a length that in the locking position during loading, relative to the connecting line between the supporting zone of the locking lever at the slide and the locking edge of the corresponding recess, a sufficient undercut is provided.

BRIEF DESCRIPTION OF THE DRAWINGS

The object and advantages of the present invention will appear more clearly from the following specification in conjunction with the accompanying drawings, in which:

FIG. 2 shows in detail the locking lever in the unloaded position as well as in the state resulting from loading.

DESCRIPTION OF PREFERRED EMBODIMENTS

Figure 1:
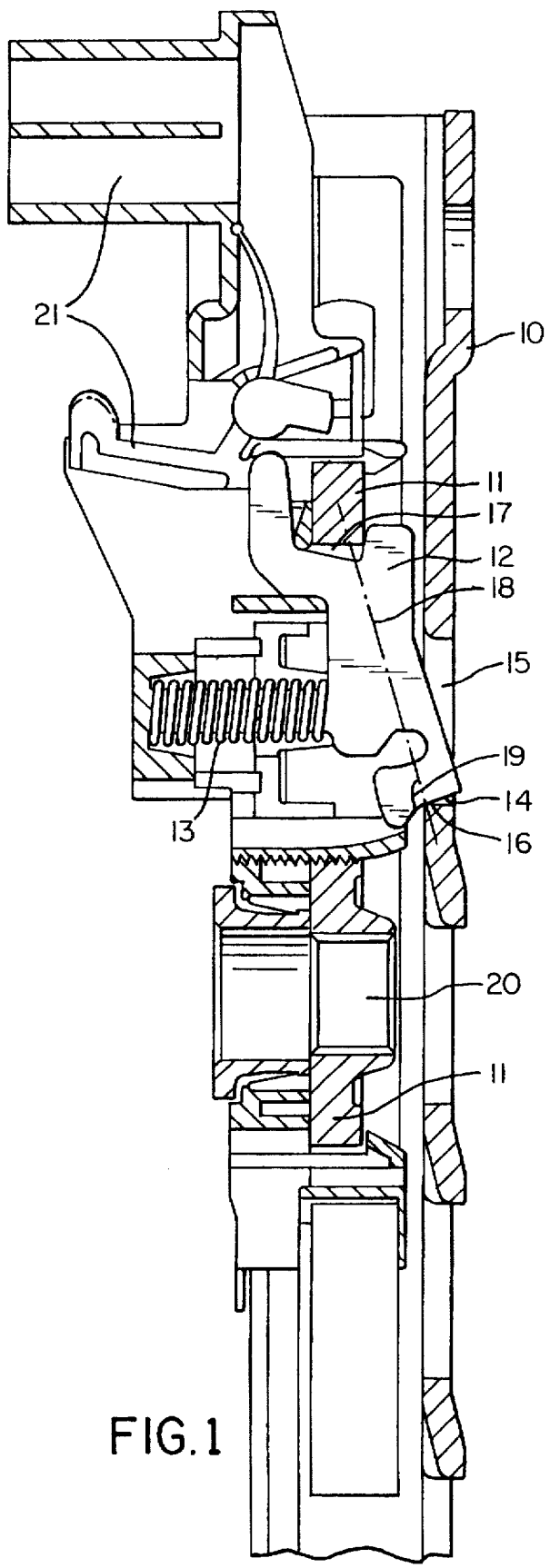
FIG. 1 shows a height adjusting mechanism in section in the unloaded locking position of the locking projection.

The present invention will now be described in detail with the aid of a specific embodiment utilizing FIGS. 1 and 2.

The height adjusting mechanism comprises a guide track 10 in which a slide 11 as a support of a non-represented fastening or deflection brace is longitudinally displaceable. In a coordinated recess of the slide 11 a locking lever 12 is pivotably supported which is prestressed by a spring 13 into its locking position in which a locking projection 14 of the locking lever 12 engages locking recesses 15 provided at the bottom of the guide track 10. In the locking position the locking projection 14 of the locking lever 12 rests on a locking edge 16 of the corresponding locking recess 15. With reference numeral 17 the supporting zone of the locking lever 12 at the slide 11 is indicated. The supporting zone 17 also defines the pivot for the pivot movement of the locking Lever 12. Depending on the position of the locking lever 12 relative to the slide 11, the supporting action of the supporting zone 17 is a surface or linear supporting action.

For the locking safety of the locking lever 12, on the one hand, and the forces related to the movement of the locking lever 12, on the other hand, the undercut of the locking projection 14 is important and this undercut is defined by an angle 19 measured in the opening direction of the locking lever 12 between the locking projection 14 and the connecting line 18 between the supporting zone 17 and the locking edge 16.

Reference numeral 20 indicates the bore for receiving a fastening means for attaching the fastening or deflection brace at the slide 11. Furthermore, the reference numeral 21 indicates the handle for releasing the locking lever 12 and for adjusting the slide 11 within the guide track 10.

As is shown in FIG. 2, the locking lever 12 at the side facing away from the locking projection 14 has a recess 22 which engages the slide 11 and with which the supporting zone of the locking lever at the slide is realized. Between the recess 22 and the locking projection 14 a cutout 24 is provided at the lateral edge 25 which in the arrangement of the locking lever 12 at the slide 11 faces away from the guide track 10 (FIG. 1). This cutout 24 is arranged such that at the lateral edge 30 opposite the lateral edge 25 a bending zone 23 is provided. The upper edge 26 and the lower edge 31 of the cutout 24 form in the area of the lateral edge 25 projections 27 extending toward one another which in the unloaded state of the locking lever have a defined distance corresponding to the deformative travel 29 between one another. At the same time, the projection 27 at the edge 26 serves as an abutment 28 in the load situation when upon loading of the bending zone, the locking projection 14 overcomes the deformative travel 29 until the projections 27 contact one another. This end position after plastic deformation of the locking projection 14 of the locking lever 12 is indicated in dashed lines in FIG. 2.

FIG. 1 shows the locking position of the locking lever 12 in the unloaded state. Since the initial angle 19 is a right angle, no undercut is provided so that the locking lever 12 can easily exit the corresponding locking recess 15, respectively, after completion of the displacement travel of the slide 11, can easily reenter an associated locking recess. In a load situation the plastic deformation of the locking lever 12 takes place whereby the deformative travel 29 is overcome so that the initial angle 19 changes such that the angular value is now smaller than 90°. For a secure locking position in the load situation the required undercut is now provided in which no force component results in the direction of release.

The invention is not only limited to recesses provided at the bottom of the guide track, according to the shown embodiment, but can also be used with all other geometric arrangements of guide tracks provided with locking recesses and correspondingly arranged locking levers.

The present invention is, of course, in no way restricted to the specific disclosure of the specification and drawings, but also encompasses any modifications within the scope of the appended claims.

What I claim is:

1. A height adjusting mechanism for an upper brace of a shoulder belt of a safety belt device of a motorized vehicle, said mechanism comprising:
    a) a guide track having a longitudinal extension and having recesses distributed along said longitudinal extension,
    b) a slide displaceable in a direction of said longitudinal extension, and
    c) a locking lever comprising a locking projection, said locking lever having a supporting zone pivotably supporting said locking lever on said slide such that said locking lever is pivotable from a locking position into a release position, wherein in said locking position said locking projection engages one of said recesses;
    wherein said locking lever comprises a zone of reduced material strength located between said locking projection and said supporting zone, wherein said zone of reduced material strength provides a deformative travel for said locking projection under load and comprises an abutment for limiting said deformative travel.

2. A height adjusting mechanism according to claim 1, wherein:
    said locking lever has a lateral edge positioned remote from said guide track;
    said zone of reduced material strength is a cutout extending from said lateral edge toward said guide track;
    wherein said cutout has a first edge located proximal to said supporting zone; and
    wherein said first edge is part of said abutment.

3. A height adjusting mechanism according to claim 2, wherein:
    said cutout has a second edge opposite said first edge;
    each one of said first and second edges has a projection located in the area of said lateral edge of said locking lever; and
    said abutment is comprised of said projections which provide a linear contact between said first and second edges.

4. A height adjusting mechanism according to claim 2, wherein said cutout extends into said locking lever to such an extent that between an inner end of said cutout and a lateral edge of said locking lever facing said guide track a bending zone is formed that has a resistance moment adapted to loading of said height adjusting mechanism during a load situation of the safety belt device.

5. A height adjusting mechanism according to claim 4, wherein each one of said recesses has a locking edge for cooperating with said locking projection, wherein said locking projection is arranged in one of said recesses such that during locking in an unloaded state said locking projection is positioned at an initial angle of less than 90° relative to a connecting line between said supporting zone and said locking edge.

6. A height adjusting mechanism according to claim 5, wherein said deformative travel has such a length that in said locking position under said loading said initial angle is decreased to provide a sufficient undercut.

7. A height adjusting mechanism according to claim 4, wherein each one of said recesses has a locking edge for cooperating with said locking projection, wherein said locking projection is arranged in one of said recesses such that during locking in an unloaded state said locking projection is positioned at an initial angle of 90° relative to a connecting line between said supporting zone and said locking edge.

8. A height adjusting mechanism according to claim 7, wherein said deformative travel has such a length that in said locking position under said loading said initial angle is decreased to provide a sufficient undercut.

9. A height adjusting mechanism according to claim 4, wherein each one of said recesses has a locking edge for cooperating with said locking projection, wherein said locking projection is arranged in one of said recesses such that during locking in an unloaded state said locking projection is positioned at an initial positive angle relative to a connecting line between said supporting zone and said locking edge.

10. A height adjusting mechanism according to claim 9, wherein said deformative travel has such a length that in said locking position under said loading said initial angle is decreased to provide a sufficient undercut.

* * * * *